United States Patent
Watanabe et al.

(10) Patent No.: US 7,430,457 B2
(45) Date of Patent: Sep. 30, 2008

(54) ROBOT TEACHING PROGRAM EDITING APPARATUS BASED ON VOICE INPUT

(75) Inventors: Atsushi Watanabe, Tokyo (JP); Yoshiharu Nagatsuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 849 days.

(21) Appl. No.: 10/983,717

(22) Filed: Nov. 9, 2004

(65) Prior Publication Data

US 2005/0102066 A1 May 12, 2005

(30) Foreign Application Priority Data

Nov. 11, 2003 (JP) .............................. 2003-380698

(51) Int. Cl.
*G05B 19/00* (2006.01)
(52) U.S. Cl. .................... 700/264; 700/245; 700/247; 700/248; 700/251; 700/257; 700/258; 700/259; 700/260; 700/261; 700/262; 318/568.11; 318/568.12; 318/568.13; 318/568.16; 318/568.21; 600/117; 600/118; 600/407; 600/426; 600/429; 606/1; 606/102; 606/130; 606/139; 901/1; 901/2; 901/27
(58) Field of Classification Search ............... 700/264, 700/245, 247, 248, 251, 257, 258, 259, 260, 700/261, 262; 318/568.11, 568.12, 568.13, 318/568.16, 568.21, 568.25; 600/117, 118, 600/407, 426, 429, 587, 595; 606/1, 102, 606/130, 139; 901/1, 2, 27

See application file for complete search history.

(56) References Cited

U.S. PATENT DOCUMENTS 6,522,950 B1 * 2/2003 Conca et al. ................. 700/245
6,684,127 B2 * 1/2004 Fujita et al. ................. 700/245

(Continued)

FOREIGN PATENT DOCUMENTS

EP 0 145 683 9/1984

(Continued)

OTHER PUBLICATIONS

Friedrich et al., Interactive generation of flexible robot programs, 1998, IEEE, pp. 538-543 vol. 1.*

(Continued)

*Primary Examiner*—Khoi H. Tran
*Assistant Examiner*—McDieunel Marc
(74) *Attorney, Agent, or Firm*—Staas & Halsey LLP (57) ABSTRACT

Candidate character strings representing objects disposed in a work cell, models for robot operation instructions which has variable parts, and robot commands related to the objects are defined in advance. By inputting a query such as 'Workpiece 1 ?' by voice, the object concerned is indicated by a display color so that the work cell can be confirmed. Models for operation instructions and a program to be edited are displayed to allow an operator to select the portion to be edited. When an operation instruction is input by voice in the model pattern, candidate character strings are assigned to the variable parts of the model. A completed statement that matches the voice-recognized statement is found, the robot operation commands defined for the objects are displayed, and the robot operation is displayed on the screen. The operation commands are inserted at the desired location in the program.

9 Claims, 7 Drawing Sheets

U.S. PATENT DOCUMENTS

| | | | |
|---|---|---|---|
| 6,718,231 B2 * | 4/2004 | Konno et al. | 700/245 |
| 6,853,878 B2 * | 2/2005 | Hirayama et al. | 700/245 |
| 7,136,723 B2 * | 11/2006 | Hirayama et al. | 700/245 |
| 7,181,315 B2 * | 2/2007 | Watanabe et al. | 700/264 |
| 7,236,854 B2 * | 6/2007 | Pretlove et al. | 700/246 |
| 2003/0018467 A1 | 1/2003 | Sekiguchi | |

FOREIGN PATENT DOCUMENTS

| | | |
|---|---|---|
| EP | 1195231 A1 | 4/2002 |
| JP | 60-156111 | 8/1985 |
| JP | 2002-2337079 | 5/2001 |
| JP | 2002-283259 | 10/2002 |

OTHER PUBLICATIONS

Onda et al., Assembly motion teaching system using position/force simulator-generating control program, 1997, IEEE, pp. 938-945 vol. 2.*

Bradakis et al., Reactive behavior design tools, 1992, IEEE, pp. 178-183.*

Son et al., An interactive generalized motion simulator (GMS) in an object-oriented framework, 2000, IEEE, pp. 176-181.*

Japanese Office Action issued in priority Japanese Application No. 2003-380698 presents rejections based on JP 2002-283259 (Reference: AG) and JP 60-156111 (Reference: AI) in Form PTO-1449 hereof.

Japanese Office Action issued in priority Japanese Application No. 2003-380698.

Notice of Grounds for Rejection dated Jul. 18, 2006.

European Search Report, dated Sep. 28, 2005, for related European Application No. EP 04 25 6831 cites US 2003/0018467 (Reference: AA); JP 2002-2337079 (Reference: AG) and EP1195231 A1 (Reference: AH) in Form PTO-1449 form hereof.

European Search Report, dated Sep. 28, 2005, for related European Application No. EP 04 25 6831.

* cited by examiner

FIG. 7

ROBOT TEACHING PROGRAM EDITING APPARATUS BASED ON VOICE INPUT

BACKGROUND OF THE INVENTION

1. Field of the Invention

The present invention relates to a program editing apparatus that can be used for editing a teaching program for a robot system.

2. Description of the Related Art

Teach pendants and offline programming systems have been used to edit (create, modify, add code to, etc.) teaching programs for robot systems. When a teach pendant is used for programming, for example, the programming is performed in the programming language of the robot, and the robot may also be moved, for example, to teach positions and the like. Programming and teaching are also frequently carried out by offline programming methods using a keyboard or mouse.

The creation and editing of teaching programs for a robot system thus involves tasks such as programming at a teach pendant or in an offline programming system, as well as teaching and modification of the program. These tasks generally require the mastering of a programming language specific to the robot, and demand complicated input procedures with a keyboardor another input device, making specialized knowledge and skills indispensable. These tasks have accordingly been difficult for non-specialists lacking such knowledge and skills. No examples of the use of voice input to solve this problem have been disclosed in the literature.

SUMMARY OF THE INVENTION

The present invention relates to a program editing apparatus that arranges and displays three-dimensional models of at least one robot and at least one peripheral object on a screen, and edits a teaching program instructing the robot how to operate. The program editing apparatus comprises: voice input means; means for storing a plurality of models each of which allows one or more character strings to be assigned in certain places therein to complete a statement; candidate character string storing means for storing a plurality of candidate character strings to be assigned to each of the plurality of models; correspondence storing means for storing correspondence between a statement completed by assigning the candidate character strings to the model and a command to be used in instruction of the robot; search means for finding a statement, if any, that matches a statement input from the voice input means, in the statements completed by assigning any of the candidate character strings to any of the stored models; and means for converting the matching statement found by the search means to a robot command according to the correspondence stored in the correspondence storing means and for inserting the robot command into the teaching program.

The program editing apparatus may take the following form.

The program editing apparatus may have means for displaying character strings of the models on the screen during editing of the teaching program.

The program editing apparatus may have means for displaying contents of the teaching program on the screen during editing of the teaching program, enabling confirmation of the result of insertion of the robot command in the teaching program.

The candidate character strings may be identification character strings that can identify objects represented by the above three-dimensional models.

The program editing apparatus may have object associated command storing means for storing an operation command for a robot related to an object represented by one of the three-dimensional models, in association with the object, and means for converting a candidate character string assigned in a statement found by the search means into a robot command according to the contents stored in the object associated command storing means, in case where the candidate character string is an identification character string.

The program editing apparatus may have means for operating the three-dimensional model of the robot on the screen, according to the robot command.

The program editing apparatus may have further means for causing the display state to change so as to indicate that the robot or the workpiece on the screen has been recognized, when the robot or the workpiece is specified by voice.

The robot command may be a macro command that includes at least one of a robot operation command, an input/output command to and from a peripheral unit, and a conditional statement.

According to the present invention, provided is program editing apparatus that accepts voice input and thereby inputs related operations and sequences, enabling programming to be performed easily without the need to master specialized knowledge and skills. As a result, person-hours and the human burden required for system construction can be reduced.

DESCRIPTION OF THE EMBODIMENTS

Figure 1:
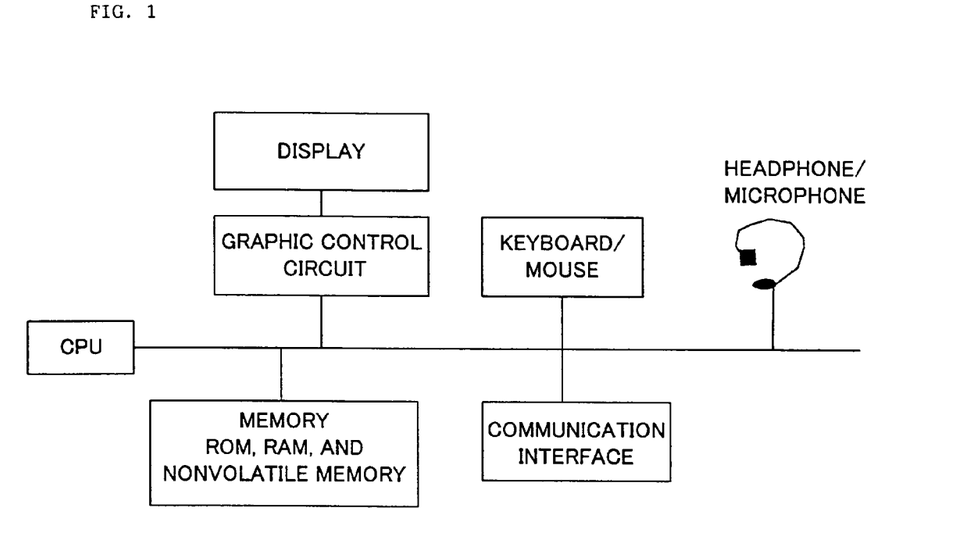
FIG. 1 is a block diagram schematically illustrating the structure of an embodiment of a program editing apparatus according to the present invention.

An embodiment of the present invention will be described with reference to the drawings. First, FIG. 1 is a block diagram schematically showing the structure of a program editing apparatus according to this embodiment. As shown in the drawing, the program editing apparatus comprises a CPU, memory (ROM, RAM, and nonvolatile memory) connected to the bus line of the CPU, a graphic control circuit, a keyboard or mouse (manual input devices), a communication interface, a headphone or microphone, and a display (liquid crystal display, CRT, or the like) connected to the graphic control circuit. An input/output device and the like (not shown) are also included, as necessary, so that data can be transmitted to and received from a printer, personal computer, or another external device.

The memory is stored with three-dimensional shape data including dimensional data (simply called three-dimensional shape data hereinafter) describing a robot to be displayed and programmed as described below, three-dimensional shape data describing workpieces and, if necessary, three-dimensional shape data describing a vision sensor (imaging device), tools (such as a hand, arc welding torch, and spot welding gun) mounted on the robot, and peripheral objects (such as, for example, workpiece fixtures and a machine tool).

The memory is also stored with programs, settings, and various other data for operating the graphic control circuit to display the objects defined by these three-dimensional models in a display space (three-dimensional space used for programming) and to display motion corresponding to robot commands in animation form. The positions and orientations of the objects (three-dimensional models) in the display space are defined by work cell data. A work cell is a unit of location for the robot system to be programmed; the work cell includes data specifying objects (three-dimensional models of a robot, workpieces, peripheral devices, and the like) in the robot system being programmed and data specifying initial positions and orientations of the specified objects. The data defining the work cell can be changed at any time by, for example, operating the keyboard or mouse.

In addition to the structure and functions described above, the program editing apparatus according to this embodiment is provided with software (a voice recognition program and other software) for program editing (described below in detail) based on voice input through the microphone and for related display and voice output by procedures and processing that will be described below.

Figure 2:
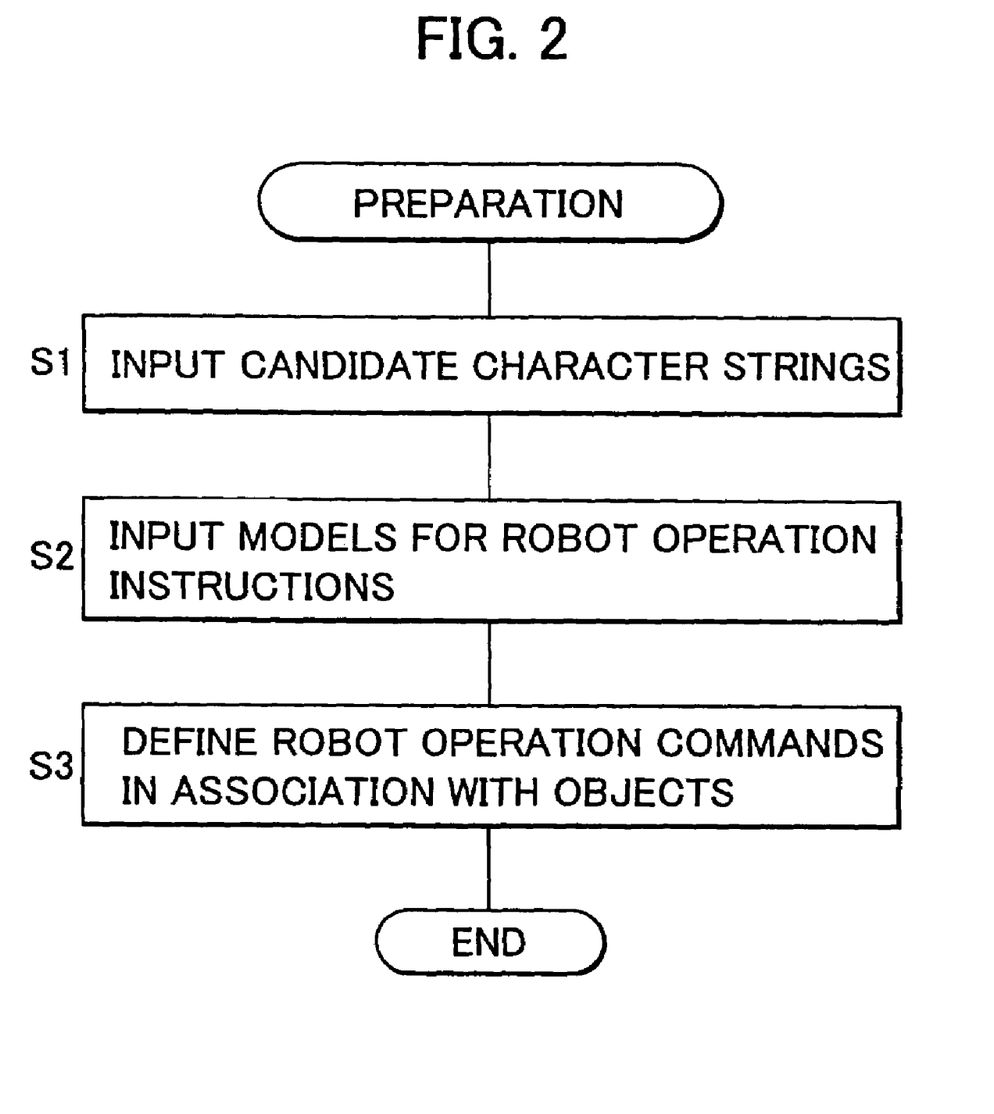
FIG. 2 is a flowchart schematically illustrating a preparatory procedure executed before program editing at the program editing apparatus shown in FIG. 1.

In this embodiment, preparations necessary for program editing based on voice input are performed first by the procedure indicated by the flowchart in FIG. 2. The steps of the procedure will be summarized below. Unless otherwise noted, references to the robots, workpieces, tools, and peripheral objects refer to their three-dimensional models.

Step S1: Candidate character strings corresponding to a plurality of objects that may be disposed in the work cell corresponding to the program to be edited are input by, for example, using the keyboard. The candidate character strings include robot names, workpiece names, peripheral object names, and so on. When a character string is input, it is stored in memory (nonvolatile memory) in the program editing apparatus. The candidate character strings are in one-to-one correspondence with the object label data in the data describing the work cell. When the work cell is displayed on the display, therefore, if an object disposed in the work cell is specified by a character string, the CPU can determine which object the character string identifies. In this embodiment, an object disposed in the work cell can be specified by voice input (in query form), as described below.

The plurality of candidate character strings that are input are structured so that whether the character strings indicate robot names or the names of objects other than robots can be identified. For example, the candidate character strings for robot names may be distinguished by black circles (●), and the candidate character strings for the names of non-robot objects, such as workpieces, peripheral objects and tools, by white circles (○).

As an example, it will be assumed here that the following candidate character strings have been input.
●robot 1
●robot 2
○workpiece 1
○workpiece 2
○workpiece 3
○workpiece 4
○workpiece 5
○machine tool 1
○workpiece port 1 (workpiece port of machine tool 1)
○table 1

Upon the completion of candidate character string input, the sequence proceeds to step S2.

Step S2: A plurality of models for robot operation instructions are input by, for example, using the keyboard; the coding of a model for a robot operation instruction comprises variable and non-variable parts.

Each variable part of the model is stored as a variable term signifying that the name of a robot is to be assigned, or a variable term signifying that the name of an object other than a robot is to be assigned.

In the following description of models for robot operation instructions, variable terms to which a robot name is to be assigned will be represented as 'robot X', 'robot Y', and so on, while variable terms to which the names of objects other than robots are to be assigned will be represented as 'object A', 'object B', and so on. This notation will also be applied to the display screen. It should be noted here that 'robot X' and 'robot Y' do not refer to the names of particular robots, nor do 'object A' and 'object B' refer to the names of particular objects other than robots.

Each non-variable part of the model includes a character or character string representing a predicate, a particle, a noun, or another word. A character string representing a noun may include a character string matching one of the specific terms used in the robot operation commands input in step S3 below. In the description that follows, character strings of this type will be represented as specific names enclosed by double quotation marks, e.g., "arc welding position" and "spot welding position".

Figure 3:
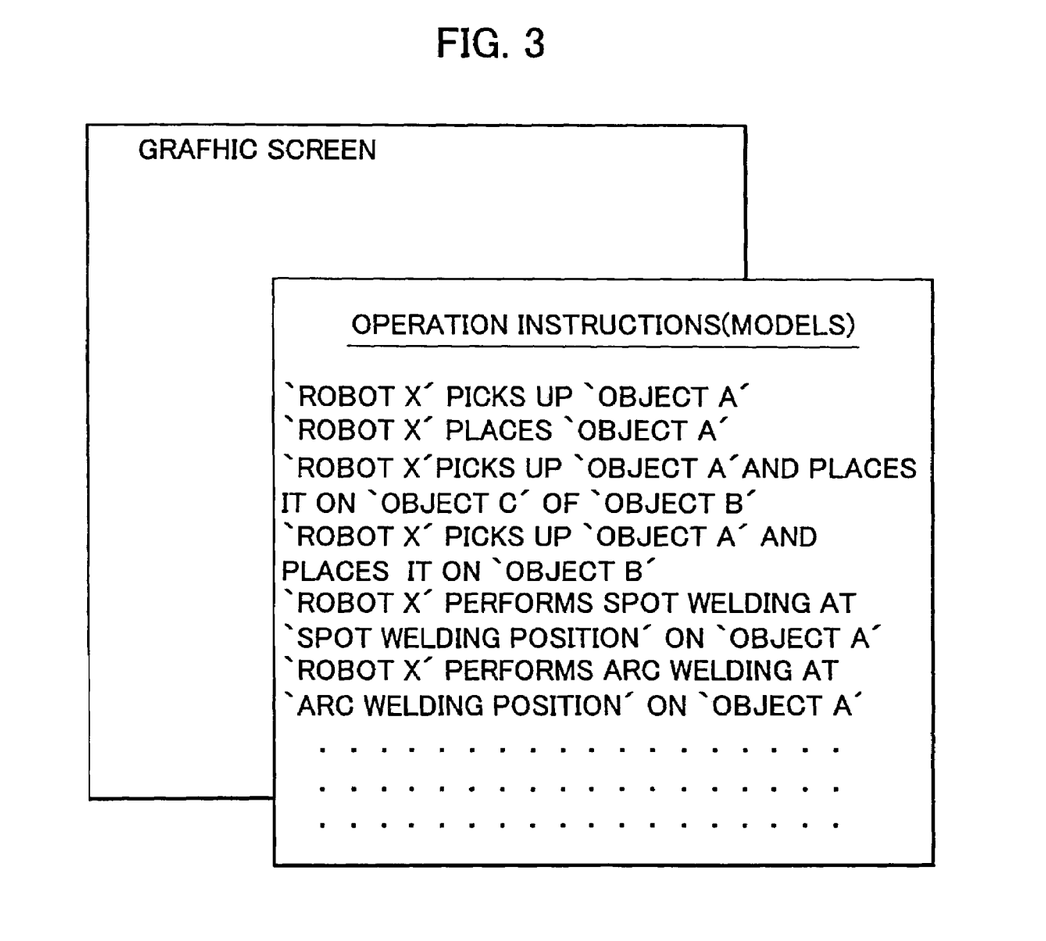
FIG. 3 shows an example of a display screen showing a model list used in the preparatory procedure in FIG. 2.

In a model for a robot operation instruction, accordingly, as shown in FIG. 3, a portion that will be replaced during voice input carried out later is enclosed by single quotation marks, while a specific term in a robot command input in relation to an object in the next step, step S3, is enclosed by double quotation marks. When a model for a robot operation instruction is stored by the program editing apparatus, in case of '★★★★', ★★★★ within the single quotation marks (' ') is stored with a header corresponding to the single quotation marks attached, and in case of "####", #### within the double quotation marks (" ") is stored with a header corresponding to the double quotation marks attached. A model prepared in this way can be displayed on the display screen anytime. FIG. 3 shows an exemplary display screen on which a model for robot operation instructions is displayed.

Step S3: Robot commands related to non-robot objects indicated by candidate character strings supplied in step S1 are now defined. In the case where a model which states 'robot X' picks up 'object A' is prepared, as shown in FIG. 3, for example, the objects that could conceivably be specified as object A (through voice input, as described later) are the workpieces 1 to 5 mentioned above, so that robot position and orientation data and other data related to approach points and grip points for gripping by the robot hand are stored for each of the workpieces 1 to 5. The data is stored as data belonging to the model which states 'robot X' picks up 'object A'. Similarly, specific data for operation commands belonging to each model is stored, in association with the objects that might be included when the model is completed.

Figure 4:
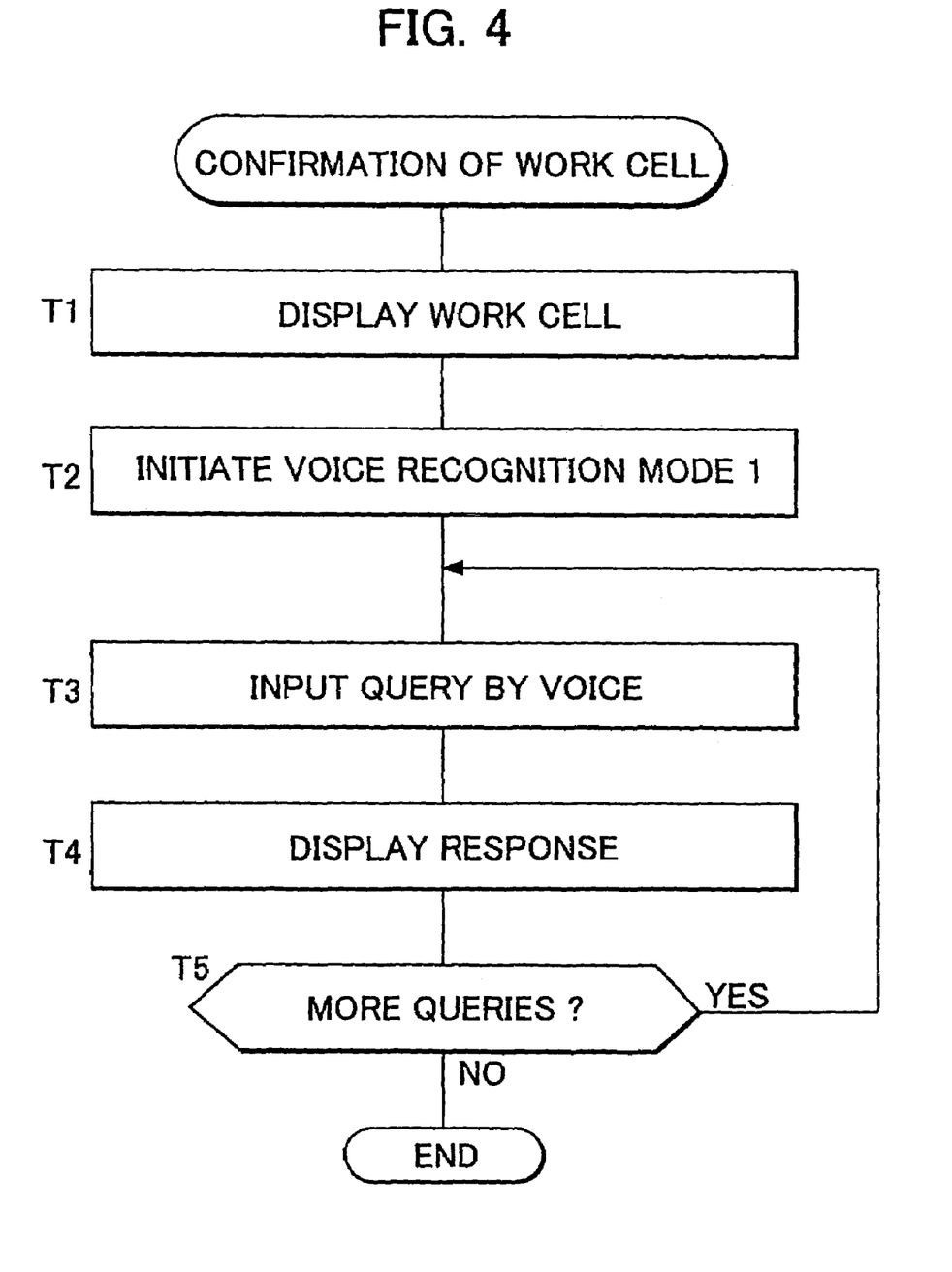
FIG. 4 is a flowchart schematically illustrating a work cell confirmation procedure executed before program editing at the program editing apparatus shown in FIG. 1.

Next, in this embodiment, the work cell is confirmed by the procedure indicated by the flowchart in FIG. 4. The steps of the procedure will be summarized below.

Figure 5:
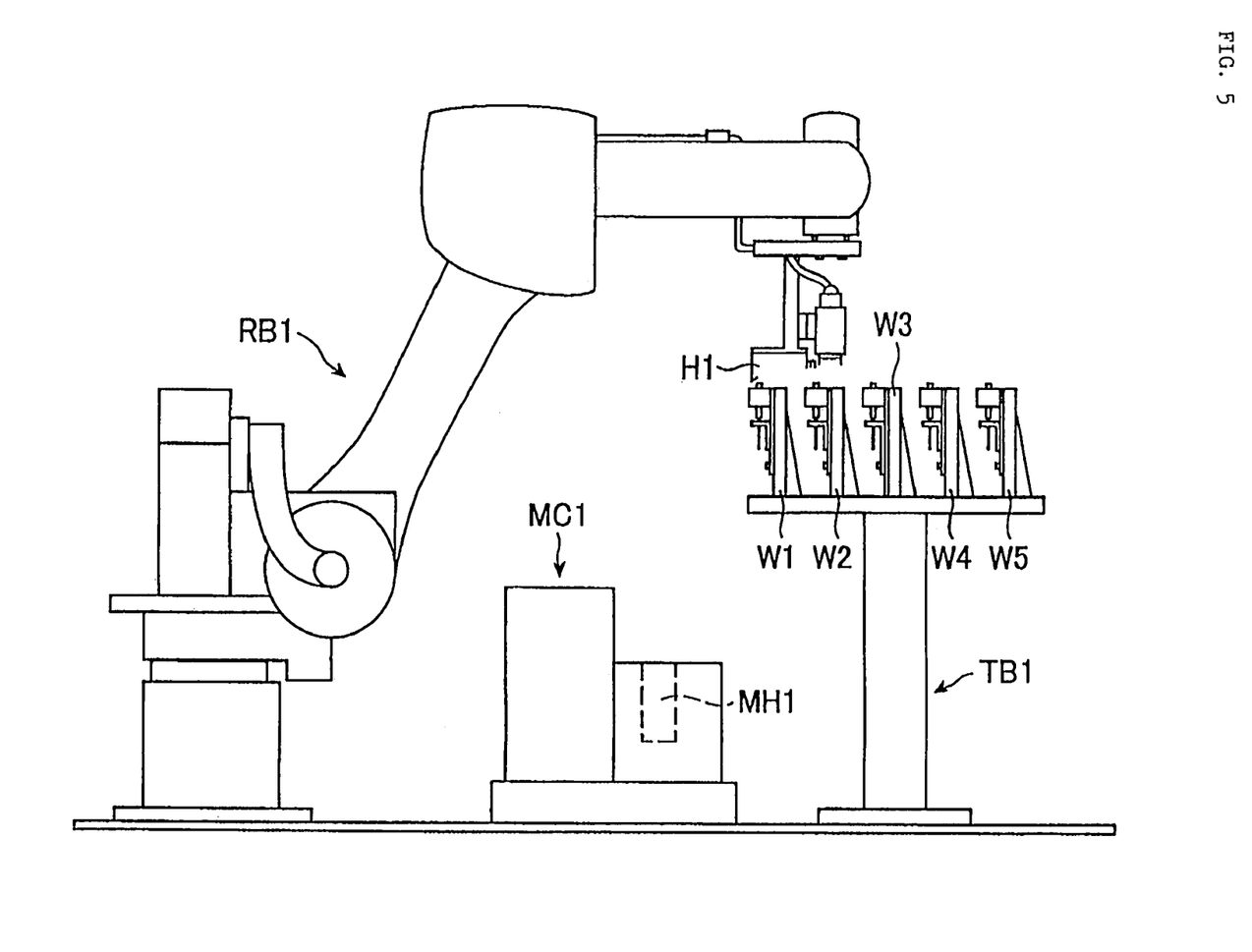
FIG. 5 is an example of a work cell display screen.

Step T1: The work cell associated with the program to be edited is displayed. It will be assumed that the work cell has already been defined by well-known methods. For example, a model for a work cell in which a robot, workpieces, peripheral objects, and other objects are provisionally disposed is prepared by external CAD apparatus (not shown) in advance, and the model is taken in the program editing apparatus via the communication interface, thereby subjecting to necessary modification, additions, deletions and other processing to define the work cell. Of course, other methods can be used; for example, existing data for a similar work cell may be taken in from other electronic data storage media (such as a hard disk or flexible magnetic disk in a personal computer) or a new work cell may be defined by means of the program editing apparatus. FIG. 5 illustrates an exemplary work cell that may be displayed.

Objects with the following names are disposed in the work cell in this example (the parenthesized items are reference characters used in FIG. 5).

robot 1 (RB1)
workpiece 1 (W1)
workpiece 2 (W2)
workpiece 3 (W3)
workpiece 4 (W4)
workpiece 5 (W5)
machine tool 1 (MC1)
workpiece port 1 (MH1)
table 1 (TB1)

Reference character H1 in FIG. 5 denotes a hand suitable for gripping workpieces 1 to 5 positioned on table 1 (a workpiece table equipped with fixtures for workpieces), the hand being attached at the end of the arm of robot 1 (RB). Reference character MH1 denotes a port for accepting workpieces; in the example described below, it will accept a workpiece held by the hand H1.

Step T2: Voice recognition mode 1 is initiated. In voice recognition mode 1, a sentence, clause, or word input by voice in step T3 below is recognized and interpreted to be a query.

Step T3: A query is input by voice in short form, such as 'Robot 1?' or 'Workpiece 3?'

Step T4: The voice input is recognized. Then it is determined which object (three-dimensional model) in the displayed work cell the query pertains to, and the result is displayed. When 'Workpiece 2?' is input by voice for the work cell shown in FIG. 5, for example, workpiece 2 (W2) on the screen is highlighted by, for example, changing the display color. If the object is not found in the work cell, a message to the effect is displayed on the screen. Instead of the display indicating the decision result, artificial voice can be output to the headphone to indicate the presence or absence of the object.

Step T5: If there are more queries to be input by voice, the sequence returns to step T3 to accept the next voice-based query. Steps T3 to T5 are repeated until there are no more queries. When all queries have been input, the process is terminated.

The range of input queries and responses can be expanded through the use of terms (character strings) employed in the work cell definitions. If, for example, the character string 'hand position' has been prepared in correspondence to the hand Hi in FIG. 5 as a candidate character string effective in voice recognition mode 1, the hand H1 in FIG. 5 can be highlighted when 'Hand position?' is input by voice.

Figure 6:
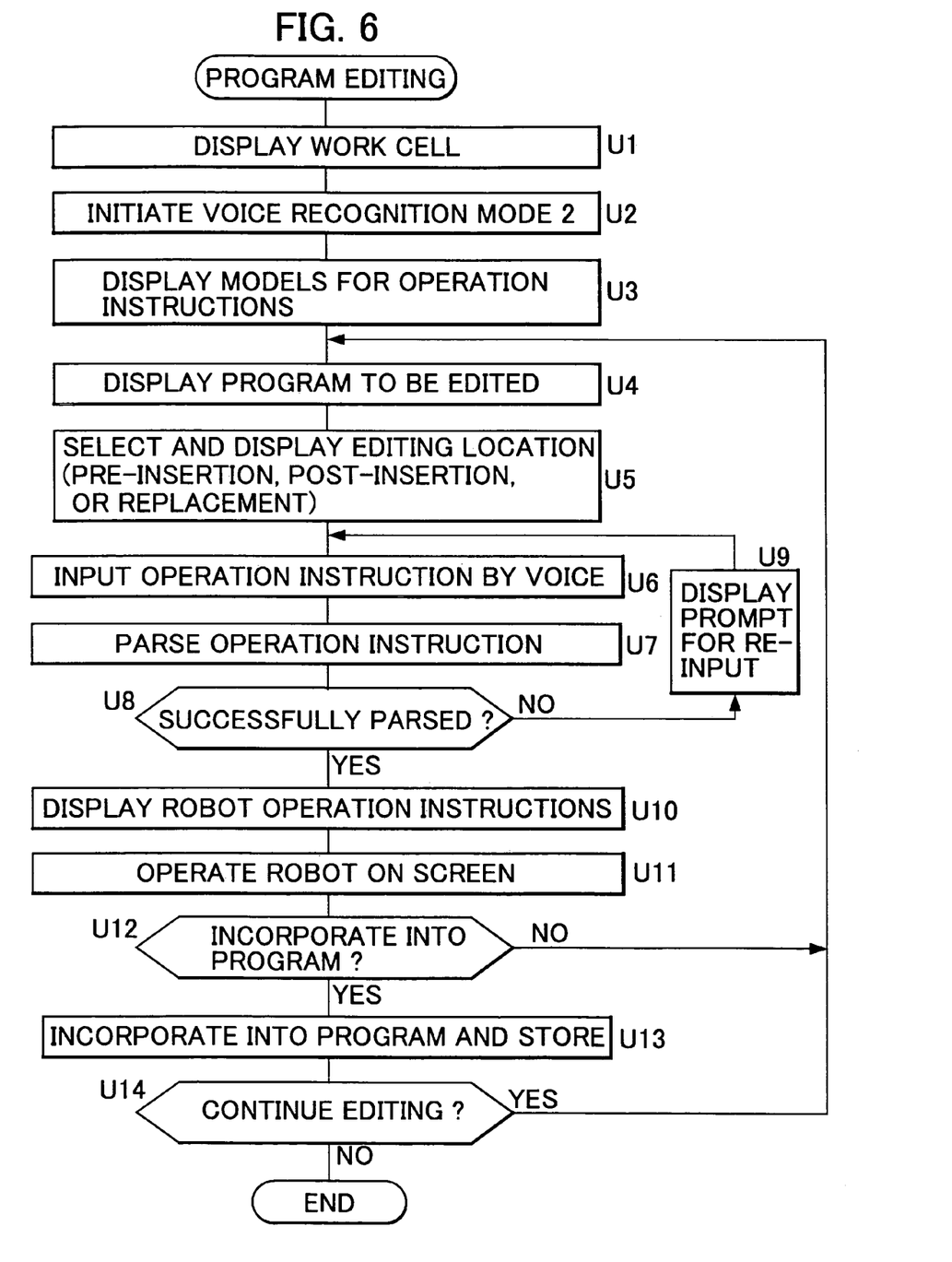
FIG. 6 is a flowchart schematically illustrating a program editing procedure at the program editing apparatus shown in FIG. 1.

When preparation and work cell confirmation have been completed as described above, program editing is performed. The flowchart in FIG. 6 shows an example of the processing flow in program editing. The steps in the flowchart will be summarized below.

Step U1: As in step T1, a work cell corresponding to the program to be edited is displayed. In this step, the work cell shown in FIG. 5 is displayed.

Step U2: Voice recognition mode 2 is initiated. Voice recognition mode 2 is an interpretation mode described below in which a sentence, clause, or word input by voice in step U6 below is recognized and an operation instruction is given (details will be given below).

Step U3: Models for operation instructions are displayed as shown in FIG. 3, for example.

Figure 7:
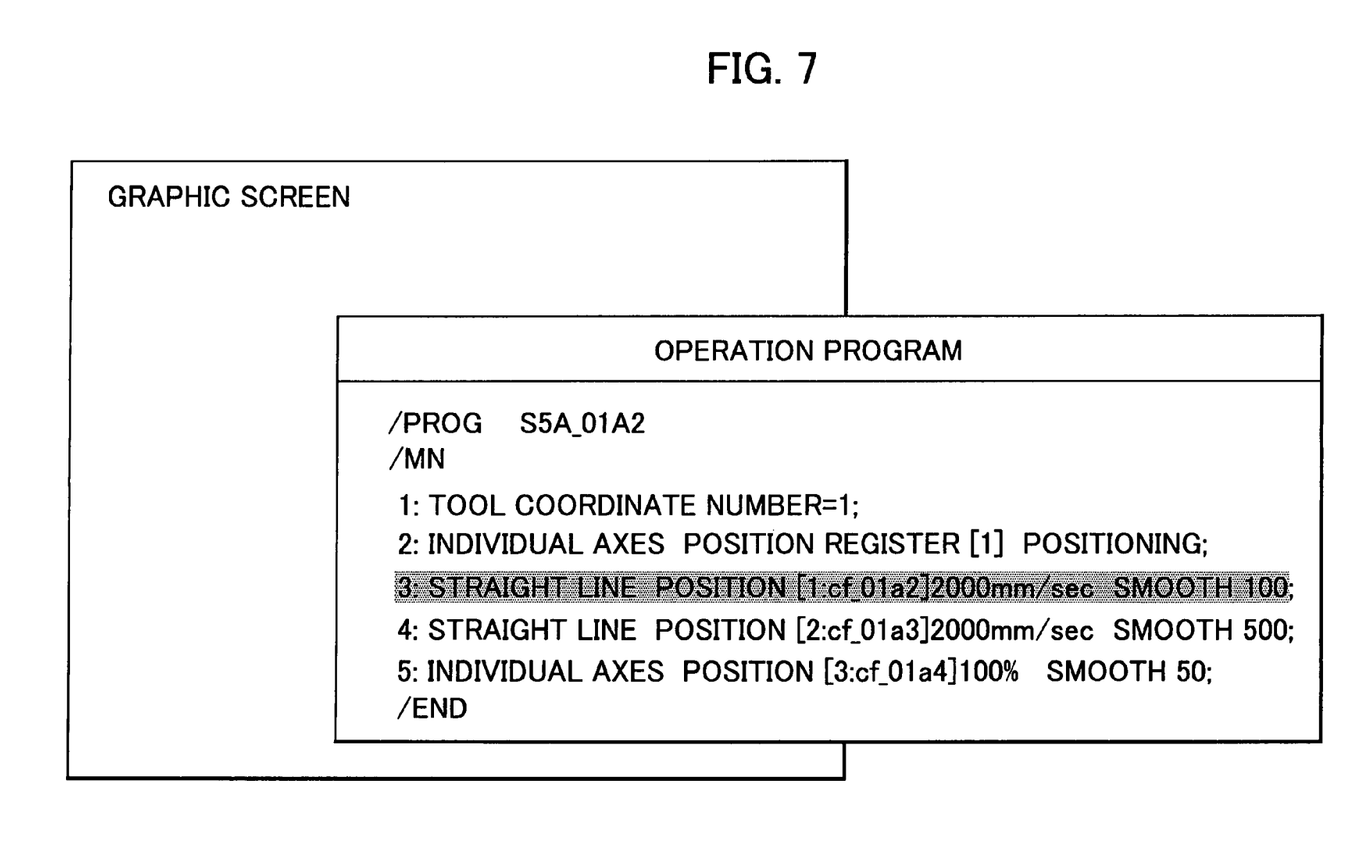
FIG. 7 is an example of a program for which program editing is undertaken at the program editing apparatus of the present invention.

Step U4: The program to be edited is displayed. In the example in FIG. 7, the program to be edited is named S5A__01A2. In FIG. 7, the third line in the command block is highlighted (shaded) to indicate the portion that will be edited in step U5.

Step U5: The portion of the program to be edited is selected, and the selection is indicated on the display. The operator uses the keyboard or another device to select a line and specify insertion of a new line above the selected line (pre-insertion), insertion of a new line below the selected line (post-insertion), or replacement of the selected line (overwriting). The selected line is highlighted. The distinction between pre-insertion, post-insertion, and overwriting can be indicated by, for example, the way in which the selected line is highlighted, e.g., by color coding, shading, underlining, or reverse video. In the example in FIG. 7, the command specified on the third line is shaded to indicate that an operation instruction will be inserted below that line, i.e., between the third and fourth lines.

Step U6: An operation instruction is input by voice. Specifically, the operator calls up the model display screen, if necessary, and while viewing the screen, inputs by voice the operation instruction the operator wants to insert at the location specified in step U5, following the pattern given by the model. As an example, 'Robot 1 picks up workpiece 1' is input by voice here, following the pattern of the first model in the model list in FIG. 3.

Steps U7, U8, and U9: The program editing apparatus executes a process for parsing the operation instruction by using the voice recognition function. Specifically, the program editing apparatus generates a series of statements completed by assigning candidate character strings to the variable parts of the models (these statements are referred to as completed statements), and compares the completed statements with the voice-recognized statement to see if they match. When a matching statement is found, the program editing apparatus displays a message on the screen and proceeds to step U10. If a statement matching the voice-recognized statement is not found even after all the candidate character strings have been assigned to all variable parts of all models (in this case, step U8 produces a NO result), the program editing apparatus displays a prompt for reinput (or informs the operator by an artificial voice alert through the headphone) in step U9, and the sequence returns to step U6.

If the program cannot proceed to step U10 even after executing steps U6 to U9 repeatedly, there may be an error (such as a missing candidate character string). When this happens, the process is terminated forcibly to find the cause of the error.

Step U10: The robot operation command (see preparatory step S3 described above) belonging to the model in the complete statement found in step U9 and stored in correspondence to the object is read and displayed. In the above example, the first model in the model list in FIG. 3 is completed in response to the voice input 'Robot 1 picks up workpiece 1', so the robot operation command (see the description of step S3 above) stored in correspondence to workpiece 1 is read and displayed. The robot operation command includes robot position data and robot orientation data for the approach points for pickup by the robot hand and for the point at which the pickup is performed.

Step U11: The operation is displayed on the screen in animation form, according to the data in the displayed robot operation command. For example, the robot 1 (RB1) displayed on the screen in FIG. 5 may be shown moving through an approach point to the pickup point.

Step U12: Whether it is safe to adopt the operation command and incorporate it into the program at the location selected in step U5 is determined from, for example, the viewpoint of the risk of interference with peripheral devices. If there is no problem, the sequence proceeds to step U13. If the operation command is not adopted, the sequence is repeated from step U4.

Step U13: The operation command is incorporated into the program at the location selected in step U5. For example, the statement corresponding to the robot operation command adopted above may be inserted between the third line and fourth line in the program shown in FIG. 7. The statements on the fourth line and the lines that follow are renumbered upward according to the number of operation statements inserted.

Step U14: If further editing is required, the sequence returns to step U4 and the desired editing is carried out by executing step U4 and the steps that follow. If there is no need to continue the editing, the process is terminated.

So far, the commands defined in correspondence to objects have been limited to operation commands for robots, but macro commands including input/output commands to and from peripheral devices, conditional statements, and the like may also be used. An example will be briefly described below. The following case will be considered.

(1) In step S3 in the above embodiment, the following subroutine is predefined in correspondence to workpiece 1 and machine tool 1. The meaning of each statement is parenthesized.

First, the following subroutine is predefined in correspondence to workpiece 1:

```
PROG WorkPick (Subroutine name)
    JP1 100% CNT, 100 (Move to approach point)
    LP2 500M FINE (Move to pickup point)
    SDO [1] ON (Grip workpiece; close hand.)
    IFRDI[1]=OFF, GOTOLBL[999] (Errorifworkpiece cannot
be gripped; halt system.)
    LP3 500M CONT, 100 (Move to back-away point)
    END
    LBL[999]
END
Next, the following subroutine is predefined in
correspondence to machine tool 1:
    PROG MachineToolInsert (Subroutine name)
        WAIT SDI[1]=ON (Wait until machine tool 1 has finished
machining previous workpiece and is ready to accept next
workpiece.)
        JP1 100% CNT, 100 (Move to approach point)
        LP2 500M FINE (Insert workpiece into workpiece port
1 of machine tool 1)
        SDO [1] OFF (Release workpiece. Open hand.)
        IF RD[1]=ON, GO TO LBL[999] (Error if workpiece
cannot be released; halt system.)
        LP3 500M CONT, 100 (Move to back-away point)
        END
        LBL[999]
    END
```

This completes the subroutines that have to be predefined in step S3 in the above embodiment, in correspondence to workpiece 1 and machine tool 1.

(2) Upon completion of the confirmation of the work cell in the above embodiment, step U1 and the following steps are executed sequentially. It will be assumed here, purely as an example, that the program displayed in step U4 is the same as before (that is, the program name is S5A_01A2) and that the editing location selected in step U5 is now pre-insertion at the third line. In the next step U6, the operation instruction 'Robot 1 picks up workpiece 1 and places it on machine tool 1 ' is input by voice.

Then, in step U7, the program editing apparatus uses the voice recognition function to execute the parsing process on the operation instruction, generates complete statements in succession by assigning candidate character strings to the variable parts of models, and searches for a matching statement. In this example, the matching statement is found from the fourth model in the model list in FIG. 3. Specifically, when robot 1 is assigned to robot X, workpiece 1 to object A, and machine tool 1 to object B, the completed statement matches the voice recognized statement.

When the sequence proceeds from step U9 to step U10, the subroutine (PROG WorkPick) stored for workpiece 1 and the subroutine (PROG MachineToolInsert) stored for machine tool 1 are read in succession and displayed. Then the operation corresponding to the displayed data is animated on the screen in step U11.

If the operation command is adopted in step U12, the above subroutines are inserted in the selected location. The relevant part of the program is shown below.

(Before editing)
2. INDIVIDUAL AXES POSITION REGISTER [1] 30% POSITIONING
3. STRAIGHT LINE POSITION [1:cf_01a2] 2000 mm/sec SMOOTH (After editing)
2. INDIVIDUAL AXES POSITION REGISTER [1] 30% POSITIONING
CALL PROG WorkPick
CALL PROG MachineToolInsert
3. STRAIGHT LINE POSITION [1:cf_01a2] 2000 mm/sec SMOOTH In this way, editing can be performed by voice input even if the input commands include conditional statements and macro commands.

The invention claimed is:

1. A program editing apparatus that arranges and displays three-dimensional models of at least one robot and at least one peripheral object on a screen, and edits a teaching program for the robot, the program editing apparatus comprising:

voice input means;

means for storing a plurality of models each of which allows one or more character strings to be assigned in certain places therein to complete a statement;

candidate character string storing means for storing a plurality of candidate character strings to be assigned to each of the plurality of models;

correspondence storing means for storing correspondence between a statement completed by assigning the candidate character strings to the model and a command to be used in instruction of the robot;

search means for finding a statement, if any, that matches a statement input from the voice input means, in the statements completed by assigning any of the candidate character strings to any of the stored models; and means for converting the matching statement found by the search means to a robot command according to the correspondence stored in the correspondence storing means and for inserting the robot command into the teaching program.

2. The program editing apparatus according to claim 1, further comprising means for displaying character strings of the models on the screen during editing of the teaching program.

3. The program editing apparatus according to claim 1, further comprising means for displaying contents of the teaching program on the screen during editing of the teaching program, enabling confirmation of the result of insertion of the robot command in the teaching program.

4. The program editing apparatus according to claim 1, wherein the candidate character strings are identification character strings that identify objects represented by the three-dimensional models.

5. The program editing apparatus according to claim 1, further comprising:
   object associated command storing means for storing an operation command for a robot related to an object represented by one of the three-dimensional models, in association with the object; and
   means for converting a candidate character string assigned in a statement found by the search means into a robot command according to the contents stored in the object associated command storing means, in case where said candidate character string is an identification character string.

6. The program editing apparatus according to claim 1, further comprising means for operating the three-dimensional model of the robot on the screen, according to the robot command.

7. The program editing apparatus according to claim 1, further comprising means for causing the display state to change so as to indicate that the robot or the workpiece on the screen has been recognized, when the robot or the workpiece is specified by voice.

8. The program editing apparatus according to claim 7, wherein the change of the display state of the robot or the workpiece is that of a display color.

9. The program editing apparatus according to claim 1, wherein the robot command is a macro command that includes at least one of a robot operation command, an input/output command to and from a peripheral unit, and a conditional statement.

* * * * *

UNITED STATES PATENT AND TRADEMARK OFFICE
CERTIFICATE OF CORRECTION

PATENT NO. : 7,430,457 B2  
APPLICATION NO. : 10/983717  
DATED : September 30, 2008  
INVENTOR(S) : Atsushi Watanabe et al.

Page 1 of 1

It is certified that error appears in the above-identified patent and that said Letters Patent is hereby corrected as shown below:

Sheet 3 of 7, FIG. 3, Line 1, change "GRAFHIC" to --GRAPHIC--.

Column 1, Line 25, change "keyboardor" to --keyboard or--.

Column 2, Line 21, change "is" to --is a--.

Column 5, Line 10, change "computer)" to --computer),--.

Column 5, Line 60, change "Hi" to --H1--.

Column 7, Line 62, change "RD[1]" to --RDI[1]--.

Column 8, Line 12, change "1 '" to --1'--.

Signed and Sealed this

Twentieth Day of January, 2009

JON W. DUDAS  
*Director of the United States Patent and Trademark Office*